No. 612,023. Patented Oct. 11, 1898.
S. C. DAVIDSON.
TIRE AND RIM FOR WHEELS.
(Application filed July 27, 1897.)
(No Model.)
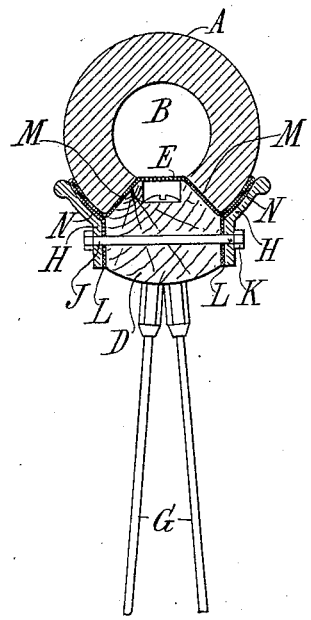
WITNESSES:
Fred White
René Bruine
INVENTOR:
Samuel Cleland Davidson,
By his Attorneys,
THE NORRIS PETERS CO., PHOTO-LITHO., WASHINGTON, D. C.

UNITED STATES PATENT OFFICE.

SAMUEL CLELAND DAVIDSON, OF BELFAST, IRELAND.

TIRE AND RIM FOR WHEELS.

SPECIFICATION forming part of Letters Patent No. 612,023, dated October 11, 1898.

Application filed July 27, 1897. Serial No. 646,120. (No model.)

*To all whom it may concern:*

Be it known that I, SAMUEL CLELAND DAVIDSON, merchant, of Sirocco Engineering Works, Belfast, Ireland, have invented certain new and useful Improvements in the Tires and Rims of Wheels for Carriages, Bicycles, and other Road-Vehicles, of which the following is a specification.

My invention has reference to the tires and rims of wheels for carriages, bicycles, and other road-vehicles in which india-rubber, leather, or other more or less elastic tires are employed to give resilience thereto, and more particularly to the type which may be termed "non-pneumatic," inasmuch as the resilience of the tires is not dependent on the employment of tubes inflated with air under pressure, such as in the tires usually known as "pneumatic." As hitherto ordinarily made, india-rubber or elastic tires of said non-pneumatic type when constructed so as to have a resilience at all equivalent to that of pneumatic tires have been found so difficult to retain securely in position on the wheel-rims when in practical use that the employment of such highly-resilient non-pneumatic tires for road-vehicles has consequently heretofore been unsuccessful, and the object, among others, of my invention is to so construct non-pneumatic india-rubber or elastic tires and the wheel-rims therefor that while the tires may have a practically similar resilience to that of pneumatic tires their attachment and mounting on the wheel-rims shall be thoroughly secure and reliable in practical use on vehicles.

According to my invention I construct the india-rubber or elastic tire with a hollow or channel around its inner face, so that a cross-section of the tire somewhat resembles a horseshoe in shape, and I mount and attach the said horseshoe-shaped tire upon the wheel-rim by means of an edging or flaps of canvas or other suitable fabric with preferably a mixture or coating of india-rubber amalgamated therewith and vulcanized to the inner faces of the tire ends, so as to form an integral part therewith and applied in such a way that the fabric connects the tire ends together. This connection forms between the fabric and the hollow interior of the horseshoe cavity in the tire what might be defined as a "tubular air-space." The outer continuation edges of the fabric are so folded along the outer edges of the tire ends as to form flaps on each side of the tire, (hereinafter referred to as the "tire-flaps,") the back-folded edges of the fabric being vulcanized to the outer sides of the tire, so as to form an integral part therewith. I construct the wheel-rim of wood or metal, with its outer face suitably shaped to support the inner faces of the tire ends and the connecting fabric between same. The outer sides of the wheel-rim are made in an approximately parallel plane with that of the wheel, so that when the tire is mounted thereon the flaps may be laid against the same. I place an annulus or sections of an annulus or washer-plates on the outer surface of the tire-flaps, and therewith secure the same to the wheel-rim by screws or bolts with nuts, the screws or bolts being passed through the annuli or washer-plates, through the flaps, and through or into the wheel-rim. The annuli or washer-plates are so constructed that their inner edges correspond with or cover the inner edges of the tire-flaps and their outer edges are turned outwardly at an obtuse angle and extend beyond the junction of the tire-flaps with the tire and fit against the inner face of the tire, so as to form a supporting flange or collar thereto for the purpose of giving the tire a firm resistance, more especially against side thrusts.

The accompanying drawing represents a cross-section of a tire and wheel-rim constructed according to my invention.

A is the tire, of india-rubber or other suitable material, and B is a continuous cavity therein, a cross-section of the tire somewhat resembling a horseshoe in shape.

D is the wheel, made solid of wood or metal, preferably aluminium.

E is a rib projecting centrally from the inner face of the rim and entering the opening in the tire. The sides of this rib are inclined, as shown, and on these inclines the inner face of the tire at each side of the opening rests.

G represents the spokes.

L L are flaps of folded canvas or other textile material. These flaps form part of a piece of canvas or material, the middle portion M M of which extends across the inner face of the tire and bridges over the opening therein, thereby closing the inner side of the cavity B and forming a tubular air-space. The canvas is vulcanized to the inner face of the tire, so as to form an integral part therewith. The outer portions of the canvas are so folded along the outer edges of the inner face of the tire as to form the flaps L L, and the outermost portions N N are vulcanized to the outer sides of the tire. The flaps L L when the tire is mounted on the rim lie against the outer sides of same and are then secured by means of the obtuse-angled side plates H, bolts J, and nuts K, the bolts passing through the plates H, flaps L, and rim D.

What I claim, and desire to secure by Letters Patent, is—

1. In a tire having a centrally-channeled inner face, a piece of folded textile material integral with said tire, said piece extending across the inner face of and closing the cavity of said tire-channel and having a flap at each outer edge fitting against the corresponding side of the wheel-rim, substantially as described.

2. In a wheel, the combination with a tire having a centrally-channeled inner face and flaps of folded textile material at the outer edges and integral therewith as set forth, of a rim shaped to support the inner face of said tire at the sides of the channel, obtuse-angled annuli or plates against the outer sides of the tire and rim and transverse bolts or screws through said plates and through said flaps and through or into said rim, whereby the tire is secured to the rim by means of said flaps and said bolts or screws, substantially as hereinbefore described.

In witness whereof I have hereunto signed my name in the presence of two subscribing witnesses.

SAMUEL CLELAND DAVIDSON.

Witnesses:
JOHN BROWN SHAW,
A. H. R. CARR.